United States Patent
Holmegaard et al.

(10) Patent No.: US 11,453,769 B2
(45) Date of Patent: Sep. 27, 2022

(54) MODIFICATION OF VIRGIN AND/OR RECYCLED CONSTRUCTION POLYMERS, USING POLY VINYL BUTYRAL (PVB), OR RECYCLED PVB FROM INDUSTRIAL WASTE STREAMS AND AN ALLOYING COPOLYMER

(71) Applicant: Shark Solutions ApS, Roskilde (DK)

(72) Inventors: Jens Holmegaard, Holte (DK); Frank Mundt, Samsø (DK)

(73) Assignee: SHARK SOLUTIONS APS, Roskilde (DK)

( * ) Notice: Subject to any disclaimer, the term of this patent is extended or adjusted under 35 U.S.C. 154(b) by 0 days.

(21) Appl. No.: 16/980,067

(22) PCT Filed: Mar. 15, 2019

(86) PCT No.: PCT/DK2019/050094
§ 371 (c)(1),
(2) Date: Sep. 11, 2020

(87) PCT Pub. No.: WO2019/174700
PCT Pub. Date: Sep. 19, 2019

(65) Prior Publication Data
US 2021/0024736 A1    Jan. 28, 2021

(30) Foreign Application Priority Data

Mar. 15, 2018  (DK) .......................... PA 2018 70168
Oct. 12, 2018  (EP) ..................................... 18200170

(51) Int. Cl.
C08L 27/06    (2006.01)
C08L 29/04    (2006.01)
C08L 29/14    (2006.01)

(52) U.S. Cl.
CPC ............. *C08L 27/06* (2013.01); *C08L 29/04* (2013.01); *C08L 29/14* (2013.01); *C08L 2205/03* (2013.01); *C08L 2666/68* (2013.01)

(58) Field of Classification Search
None
See application file for complete search history.

(56) References Cited

U.S. PATENT DOCUMENTS

| 5,514,752 | A | * | 5/1996 | Gutweiler | ............... | C08L 23/10 |
| | | | | | | 525/154 |
| 5,770,654 | A | | 6/1998 | Blatz | | |
| 6,506,835 | B1 | * | 1/2003 | Hofmann | .......... | B32B 17/10761 |
| | | | | | | 525/401 |

FOREIGN PATENT DOCUMENTS

WO    93/02141 A1    2/1993
WO    99/57196 A1    11/1999
(Continued)

OTHER PUBLICATIONS

International Search Report dated Jun. 5, 2019 for PCT/DK2019/050094.
(Continued)

*Primary Examiner* — Richard A Huhn
(74) *Attorney, Agent, or Firm* — Schmeiser, Olsen & Watts, LLP

(57) ABSTRACT

Plasticizer composition for a construction polymers. The plasticizer composition includes 35-65% (by weight) of polyvinylbutyral and 65-35% (by weight) of one or more alloying copolymers. The construction polymer is e.g. polyvinyl chloride, polypropylene, poly urethane, acryl butadiene styrene or polyethylene and/or mixtures thereof. The resulting polymer construction polymer constitutes 25-90% by weight and the plasticizer composition constitutes 10-75% by weight of the polymer blend composition. The components of the plasticizer composition are non-migrat- (Continued)

ing and provide surprising physical properties of the final polymer composition.

17 Claims, 9 Drawing Sheets

(56) References Cited

FOREIGN PATENT DOCUMENTS

| | | | |
|---|---|---|---|
| WO | WO-9957196 A1 * | 11/1999 | ............. C08L 27/06 |
| WO | 2018/041007 A1 | 3/2018 | |

OTHER PUBLICATIONS

Written Opinion by International Searching Authority dated Jun. 5, 2019 for PCT/DK2019/050094.
European Search Report for EP 18 20 0170 dated Feb. 20, 2019.

\* cited by examiner

MODIFICATION OF VIRGIN AND/OR RECYCLED CONSTRUCTION POLYMERS, USING POLY VINYL BUTYRAL (PVB), OR RECYCLED PVB FROM INDUSTRIAL WASTE STREAMS AND AN ALLOYING COPOLYMER

CROSS-REFERENCE TO RELATED APPLICATIONS

This application claims priority to PCT Application No. PCT/DK2019/050094, having a filing date of Mar. 15, 2019, which is based on EP Application No. 18200170.1, having a filing date of Oct. 12, 2018 and DK Application No. PA 201870168, having a filing date of Mar. 15, 2018, the entire contents both of which are hereby incorporated by reference.

FIELD OF TECHNOLOGY

The following relates to a plasticizer composition for construction polymer compositions.

The following also describes a polymer composition blend.

Similarly, the following relates to a method for modifying a construction polymeric composition.

BACKGROUND

PVC and other construction polymers are used frequently in the construction of various products.

In some applications the PVC (or other construction polymers) needs a plasticizer to soften or render the polymer matrix more flexible in order to provide the desired physical properties of a certain product.

Traditional plasticizers for PVC construction polymers contain phthalates, and/or halogenated compounds. These compounds do however tend to migrate in the PVC matrix and are susceptible to leaching out of the polymer matrix over time, especially when the product is in contact with water. This results in slowly changing physical properties of the product, e.g. by increased brittleness of the product.

In addition, these traditionally used plasticizers are toxic to humans and/or to the environment. Some of these plasticizers for PVC are gradually phased out.

This has resulted in that PVC is slowly being limited in use. In Denmark legislation now requires limitation of use of PVC to certain applications, where direct human contact and/or leach risk is limited or eliminated.

The risk of leaching out is also a problem in relation to waste fractions of PVC. PVC waste is also problematic, because it forms dioxins and/or hydrochloric acid when incinerated. Thus the PVC waste is not easily disposed of. This has also limited the use of PVC.

There exist modern solid plasticizers that are applicable for use in PVC, which are non-migrating and thus not likely to leach.

At present, PVC with these modern plasticizers is mostly limited to use as roofing, geomembranes or similar applications.

Thus, there is a need for plasticizer solutions for construction polymers, in particular for PVC, which are non-migrating in the polymer matrix, and which are non-toxic and with a "green"/environmentally friendly profile.

There is also a need for plasticizer solutions for construction polymers, in particular for PVC, which are free from halogens, and/or phthalates.

There is also a need for plasticizer solutions for construction polymers, in particular for PVC, which provide compounded polymer alloys where the plasticizers are non-migrating and thus not leached from the polymer matrix.

SUMMARY

An aspect relates to a solution for applying plasticizer compositions to construction polymers, e.g. PVC, polyethylenes (PE), polypropylenes (PP), acryl butadiene styrenes (ABS) and/or polyurethanes (PU), where the components of the plasticizer composition are non-migrating in the polymer matrix and thus not easily leached out of the polymer matrix.

It is also an aspect of embodiments of the present invention to provide a solution for applying plasticizer compositions to construction polymers, which are free from halogens, and/or phthalates and/or which are non-toxic and with a "green"/environmentally friendly profile.

It is also an aspect of embodiments of the present invention to provide a solution for applying plasticizer compositions to construction polymers, in particular for PVC, which provide compounded polymer alloys from which plasticizers are non-migrating and thus not leached from the polymer matrix.

It is also an aspect of embodiments of the present invention to facilitate greater use of recycled construction polymers in new applications due to tunability of properties during the recycling process by addition of this compound, modifying elasticity, impact parameters and plasticisation.

The above-mentioned drawbacks and aspects of embodiments of the present invention are met by a plasticizer composition for a construction polymer, wherein said plasticizer composition comprises 35-65% (by weight) of polyvinylbutyral (PVB) and 65-35% (by weight) of one or more alloying copolymers.

This composition is primarily intended as a totally non-migrating plasticizer for flexible construction polymer applications, in particular PVC applications and/or for modification of other polymers as mentioned further below. Composites and construction polymers can also benefit from this polymer-alloy with both elastic and acoustical properties. In addition, this balanced weight ratio leads to an extrudable polymer material which can be pelletized and is thus very easy to handle. The plasticizer composition can thus be used as part of a construction polymer blend as described further below. The plasticizer composition is solid and can alternatively be used by directly mixing the individual components of PVB and the alloying copolymer(s) into the construction polymer or polymers as also described further below.

This plasticizer composition has surprisingly proven to be superior when PVB is used in combination with the alloying copolymer, and provide unforeseen synergistic effects when applied as a plasticizer composition in construction polymers such as poly vinyl chloride (PVC), in particular recycled PVC, and other virgin or recycled construction polymers, such as polyethylene (PE), polypropylenes (PP), acryl butadiene styrene (ABS) and/or polyurethanes (PU).

Construction polymers modified with the plasticizer composition according to embodiments of the present invention, including modified PVC, form uniform, extrudable and mouldable polymer alloys with changes in mechanical properties, and plasticization where migration of PVB and the alloying copolymer(s) are sterically hindered.

The resulting polymer matrix contains a blend of the applied polymers in which the different polymer molecules, i.e. the construction polymer, PVB and the alloying copolymer are intermixed and thus not susceptible to migration within the polymer matrix. The microstructure of the resulting polymer matrix appears more like a true alloy (as known from metals), where the compounds form a "true" all homogeneous mixture, especially in PVC applications.

In previous applications, the plasticized polymer matrix often comprises embedded macroscopic or microscopic volumes of isolated plasticizer resulting in a microstructure resembling an emulsion. In such microstructures, the plasticizer may be susceptible to migration and/or less efficient plasticizing effect resulting in increased brittleness and/or that the products become brittle much faster, e.g. when exposed to weathering effects.

Embodiments of the present invention focus on using poly vinyl butyral (PVB), or recycled PVB from industrial waste streams, as non-migrating plasticizer and impact modifier in a specific and unforeseen combination with alloying polymers.

If PVB is used as sole plasticizer additive in e.g. PVC, there is poor compatibility leading to limited plasticizing effect and brittleness of the resulting product. A less successful microstructure (with microvolumes of PVB embedded in the construction polymer/PVC matrix) may also result in unwanted drawbacks such as reduced tear strength, risk of partial deterioration over time and risk of uneven freeze-fracture.

According to embodiments of the present invention by including PVB in a solid state non-migrating plasticizer, the above mentioned drawbacks of using PVB as plasticizer, especially in PVC, are avoided. Further, PVB can be maximized and the properties of the final polymer matrix enhanced. Here elongation at break, the change of flexural and tensile modulus, the improved Charpy strength and the maintained surface tension are the most important.

Thus, embodiments of the present invention give new design possibilities for constructional polymers and in particular PVC, since plasticization is scalable, and the microstructure of the blend reproducible and homogeneous.

Further the plasticizer composition according to embodiments of the present invention modifies recycled PVC as well, giving possibility to scale and tune properties of rPVC (recycled or reclaimed PVC) for extended and meaningful reuse. It is in practice possible to extract unwanted plasticizers from the PVC by liquid or supercritical $CO_2$ extraction, hereby giving possibility of recovering PVC without the problematic previously used plasticizers. Thus, with embodiments of the present invention it is also possible to reuse reclaimed PVC (rPVC) by combining the rPVC with a controlled macromolecular plasticizer according to embodiments of the present invention, by using the plasticizer composition of PVB together with the alloying copolymer.

The confined formulation window ascertains the formation of the microstructures of the blend giving the desired modification of the product's physical properties as elongation at break, the change of flexural and tensile modulus, the improved Charpy strength without lowering the surface tension of the compound.

It is believed that the combination of PVB and the alloying polymer sterically lock the plasticizer in the construction polymer, thus preventing migration, elution or solution thereof.

Recycled PVB, polyvinylbutyral, comes from waste laminated glass from automotive front windows or other laminated glass applications, e.g. from buildings and/or furniture. The PVB fraction is reclaimed and thoroughly cleaned, sorted and reprocessed to the highest standards. Pellets are formed of the (reclaimed) PVB where PVB is carefully compounded and extruded to form the pellets. When using recycled PVB (rPVB) a "green" or an environmentally friendly profile can be obtained on the new products, because problematic waste streams, that else would be thrown at landfills or incinerated are utilized for new products. The environmental advantage, of the recovered PVB mined from the direct waste stream to incineration or landfill is thus evident. The "green" and environmentally friendly profile is improved even further if the constructional polymers, e.g. PVC, is also recycled from a waste stream.

The alloying copolymer(s), see further below, are solids at room temperature and pellets thereof may be mixed with the PVB prior to forming the plasticizer composition pellets in extruders or roll mixers. This simplifies the addition of the plasticizer composition and improves intermixing of the plasticizer composition into the construction polymer stream, especially when it is to be mixed directly into the extruder.

Alternatively, the alloying copolymer(s) are provided as separate pellets that are mixed with PVB pellets in the ratios described above or below. This simplifies the production of the plasticizer composition and reduces production costs while not reducing the synergistic effects of PVB and the alloying copolymer(s).

As already indicated above, the polyvinylbutyral component may be recycled polyvinylbutyral, virgin polyvinylbutyral or a mixture thereof. However also virgin grades of PVB may be used for this purpose.

The alloying copolymers are solid at room temperature and thus easily form pellets, e.g. when blended with the above mentioned PVB. The alloying copolymers may be selected from Ethylene Vinyl Alcohol Copolymer Resins (E/VA/CO) (marketed under the tradename Elvaloy® by Dupont)

Ethylene copolymer based compatibilizer (marketed under the tradename Entira® by DuPont)

A modified ethylene acrylate carbon monoxide terpolymer composition comprising ethylene vinyl acetates (EVAs), polyethylene, metallocene polyethylenes, ethylene propylene rubbers and polypropylenes (marketed under the tradename Fusabond® by DuPont)

Functional polymers which promote compatibilization between polyolefins and polar polymers such as ethylene vinyl alcohol and also polyamide and blends of polar polymers like PVB and PVC. These functions by enhancing the dispersion of the polar polymers into the polyolefin matrix, such that the haze and microstructures of the resulting structure is minimized. (marketed under the tradename Retain® by Dow)

ethylene vinyl acetate copolymer (marketed under the tradename Elwax® by DuPont) And/or mixtures thereof.

In applications involving PVC as the constructional polymer, the alloying polymer may be an Ethylene vinyl alcohol Copolymer Resins (e.g. marketed under the tradename Elvaloy® by Dupont), optionally combined with one or more other alloying copolymer(s) as the synergistic effects on plasticizing effect, as well as the alloying effect on the resulting polymer blend or mixture is particularly pronounced when used together with PVB. The molecular weight of the PVB or rPVB may be in the full range from 25 kg/mol to 465 kg/mol covering both virgin PVB and the experienced variation in rPVB.

The plasticizer composition may comprise 40-60% of PVB with 60-40% by weight of the alloying copolymer(s) or 45-55% by weight of PVB and 55-45% by weight of the alloying copolymer(s) or 50% by weight of PVB and 50% by weight of the alloying copolymer(s).

The polyvinylbutyral modified with the alloying copolymer may be used in the above mentioned stochiometric ratios to Ethylene vinyl alcohol Copolymer Resins and others. Due to the alloying effect of different polymer groups, hydroxyl- and other polar groups like —Cl in PVC the resulting properties are not linear-combinations of known properties for the pure components, as also the inner microscopical structure are not just a blend of ordinary polymers since the boundaries between domains are not sharp, and the individual polymers not locally recognizable.

The aspects of embodiments of the present invention are also met by a polymer composition or blend, which comprising a construction polymer and a plasticizer composition as described above, wherein the construction polymer constitutes 25-90% by weight of the polymer blend and the plasticizer composition constitutes 10-75% by weight of the polymer blend composition.

The resulting polymer blend compound is primarily intended as a totally non-migrating plasticizer for flexible PVC applications and for impact modification of other polymers. Composites and construction polymers can also benefit from this polymer-alloy with both elastic and acoustical properties.

The construction polymer of the polymer composition may be selected from the group comprising polyvinyl chloride (PVC), polypropylene (PP), poly urethane (PU), acryl butadiene styrene (ABS) or polyethylene (PE) and/or mixtures thereof, because the synergistic effect of the plasticizer composition of PVB with the alloying copolymer is most pronounced with these construction polymers.

The plasticizer composition may constitute at least 30% by weight of the amount of the polymeric composition, or 30-50% by weight of the polymer blend composition or 40% of the polymer blend composition. This is because the favourable "alloyed" microstructure of the polymer matrix is most pronounced, and because the synergistic effects of PVB and the alloying copolymer is most pronounced as already discussed above in relation to the plasticizer composition.

The intensity and efficiency of the thermoplastic mixing in extruders or roll mixing can be used to scale the fineness of the blend, where the most intensive and smallest domain size of the resulting blend may be preferred.

As already mentioned above, the polymer composition may comprise a construction polymer, which may be selected from virgin polyvinyl chloride (PVC) or recycled polyvinylchloride (PVC) or a mixture thereof.

The polymer composition may be mixed with one or more further components, such as colorants, stabilizers, antioxidants, fillers, UV filters and/or mixtures thereof.

Other additives, such as colorants, preservatives, stabilizers, fillers, UV filters and/or or antioxidants may be added to the polymer blend. One or more suitable additives may be added in an amount of 0.01-65% by weight relative to the total of the final polymer composition after mixing with additives.

Suitable stabilizers for plasticized PVC based polymer blends according to embodiments of the present invention are e.g. Calcium-Zinc complexes, stabilisers based on erythritols, e.g. pentaerythritol tetrakis(3-(3,5-di-tert-butyl-4-hydroxyphenyl)-propionate) (marketed as Irganox™ 1010), phosphites, such as Tris(2,4-ditert-butylphenyl)phosphite (marketed as Irgafos™ 168), and/or mixtures thereof. Stabilizers may in particular be used in amounts of 0.5-1% by weight of the final composition.

These stabilizers are used when processing the polymer composition under elevated temperatures. If processing the polymer composition at temperatures above 160° C., there is a risk of degradation of PVB in the polymer composition mixture, which can be avoided by adding stabilizers as mentioned above.

Suitable colorants are among others Titanium (IV)-oxide, carbon black, and/or typical well-known colorants used in polymers. Such well-known colorants are usually called masterbatch and ultrabatch compounded colorants containing the colorant and a carrying polymer.

Also, fillers such as calciumcarbonate, fibers can be added to the polymer blend in relatively large amounts. For example inorganic fillers may be added in up to 50% by weight or sometimes up to 60% by weight of the final composition.

If a foamed material is to be used, one or more foaming agents, e.g. Hydrocerol® (made by Clairant) can be used in the final polymer composition. For example, foaming agents may be used in amounts of up to 5% by weight of the final composition.

The above mentioned objects are also met by a method of modifying a construction polymer comprising mixing 25-90% by weight of solids of a construction polymer and 10-75% by weight of the plasticizer composition as described above, heating the blend to above the melting point and shaping the polymer blend composition.

As mentioned above, the plasticizer composition according to embodiments of the present invention may be solid and may be pelletized to allow fast and effective mixing with the construction polymers. The pelletized plasticiser composition may e.g. be mixed e.g. be mixed with construction polymer raw material (which are typically also pelletized) prior to heating. The mixing can be easily done before the extruder or a two-roll mixer. In some situations, pelletized PVB and pelletized alloying polymer are added separately to the construction polymer in above mentioned amounts of each component.

This ensures thorough mixing of the plasticizer composition and the construction polymer prior to melting and shaping of the resulting polymer mixture/blend.

Alternatively, the pelletized plasticizer composition may be added into a flow of melted construction polymer, e.g. by introducing the pellets into a flow mixer which mixes the pellets into the melt and ensures efficient mixing of the plasticizer composition into the construction polymer melt or by mixing the pellets into the melt in the extruder, e.g. at the inlet thereof. Hereby the plasticizer pellets will melt and the plasticizer composition will be thoroughly mixed into the construction polymer melt. This thorough mixing of the pelletized plasticizer into the construction polymer also ensures effective dispersion of the plasticizer so as to provide the above-mentioned alloying properties.

The method of modifying a construction polymer may comprise that the heating step is included in the shaping step. This often occurs, e.g. when extruding items, where the heating causes melting immediately prior to or while shaping the product into the final shape.

As already discussed above in relation to the plasticizer composition as well as the polymer composition, the method may include that the plasticizer composition comprises 35-65% (by weight) of polyvinylbutyral (PVB) and 65-35% (by weight) of an alloying copolymer.

As already discussed above in relation to the plasticizer composition as well as the polymer composition, the method may include that the polymer composition blend comprises 35-45% by weight of the plasticizer composition and 65-55% by weight of construction polymer, or 40% by weight of plasticizer composition and 60% by weight of the construction polymer.

As also already discussed above in relation to the polymer composition, the method may include adding one or more additional additives to the mixture of solids of plasticizer composition and construction polymer and to construction polymer blend composition when the polymer blend composition is in solid or melted state.

BRIEF DESCRIPTION

Some of the embodiments will be described in detail, with references to the following Figures, wherein like designations denote like members, wherein.

DETAILED DESCRIPTION

Figure 1:
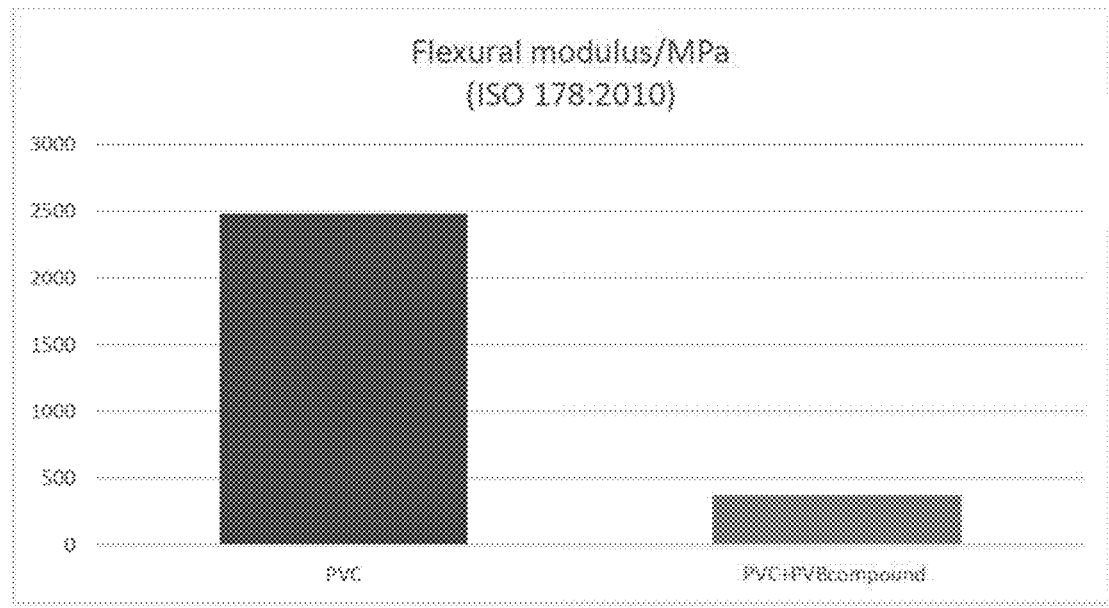
FIG. 1 depicts average values of flexural modulus for a pure PVC reference specimen and test specimens.

Method of modification of Poly vinyl chloride (PVC) and recycled PVC, and other virgin or recycled construction polymers, using poly vinyl butyral (PVB), or recycled PVB from industrial waste streams, as non-migrating plasticizer and impact modifier in a specific and unforeseen combination with alloying polymers as Elvaloy™ (Ethylene Copolymer Resin), Entira™ (Ethylene copolymer based compatibilizer), Fusabond™ (Products line including modified ethylene acrylate carbon monoxide terpolymers, ethylene vinyl acetates (EVAs), polyethylene, metallocene polyethylene, ethylene propylene rubbers and polypropylenes) and Retain™ from Dow (functional polymer working as compatibilization promoter for polar polymers).

PVC and recycled PVC, construction polymers as polypropylene (PP), poly urethane (PU), acryl butadiene styrene (ABS) or polyethylene (PE), can be advantageously modified by use of a pelletized blend of PVB and Elvaloy™ within confined limits. The basis-polymer/PVB/blend with the alloying component chosen from Elvaloy™, Entira™, Fusabond™ and/or Retain™ polymers or copolymers forms uniform, extrudable and moldable polymer alloys with changes in mechanical properties, and a resulting plasticization sterically hindered in migration.

The method may be limited to the following window of formulation for the constituents PVB and alloying copolymer:

1. PVB: 35-65% by weight mixed with
2. Alloying copolymer: 65-35% by weight

A formulation may comprise 45-55% by weight of PVB and 55-45% by weight of the alloying copolymer(s). A formulation may comprise 50% by weight of PVB and 50% by weight of the alloying copolymer(s).

This balanced weight ratio of the plasticizer composition relative to the construction polymer leads to an extrudable compound material to be used as part of a construction polymer blend in an amount of 10-75% by weight of the total polymer blend with typical optimal composition having around 40% by weight of plasticizer composition to around 60% by weight of construction polymer(s).

This method can also be used by directly mixing the individual components PVB and the alloying copolymer into the construction polymer or polymers.

PVB, polyvinylbutyral, from automotive front windows are claimed and thoroughly cleaned, sorted and reprocessed to the highest standards. Pellets modified to be compatible with PVC are carefully compounded and extruded as a masterbatch to be blended directly in the PVC-extruding stream.

The confined formulation window ascertains the formation of the microstructures of the blend giving the desired modification of the product and the desired sterically lock of the plasticizer preventing migration, elution or solution of this.

The compound is primarily intended as a totally non-migrating plasticizer for flexible PVC applications and for impact modification of other polymers. Composites and construction polymers can also benefit from this polymer-alloy with both elastic and acoustical properties.

Polymer type: Modified Polyvinylbutyral-alloy in fixed stoichiometric ratio to Ethylene vinyl alcohol Copolymer Resins and/or other alloying copolymers. Due to the alloying of different polymer groups the resulting properties are not linear-combinations of known properties for the pure components, as also the inner microscopical structure are not just a blend of ordinary polymers.

The environmental advantage, of the recovered PVB mined from the direct waste stream to incineration or landfill, has major importance.

PVB acts as a totally nonmigrating plasticizer for PVC and adds valuable properties to the PVC. Further the compound modifies recycled PVC as well, giving possibility to scale and tune properties of rPVC (recycled or reclaimed PVC) for extended and meaningful reuse. In this exists the option to extract unwanted plasticizers from the PVC by liquid $CO_2$ wash in commercially available washing machines, hereby giving possibility of recycling of PVC with a controlled macromolecular plasticizer being an alloyed copolymer.

If PVB is used alone with PVC, there is poor compatibility between both, leading to limited plasticisation effect and brittleness of the resulting polymer. A less successful microstructure may also form giving unwanted drawbacks.

Using embodiments of this invention as solid state non-migrating plasticizer, the effect of PVB can be maximized and the properties of the final polymer matrix enhanced.

Embodiments of the method gives new design possibilities for PVC, since plasticization is scalable, and the microstructure of the blend reproducible and homogeneous.

Regulatory Status

Halogen free, phthalate free compounded alloy specialized to be a modern non-migrating PVC plasticizer with no toxicity and a green profile.

Other additives, such as colorants, preservatives, stabilizers, and/or or antioxidants may be added to the polymer blend. One or more suitable additives may be added in an amount of 0.01-65% by weight relative to the total polymer blend).

Suitable stabilizers for plasticized PVC based polymer blends according to the pre-sent invention are e.g. Calcium-Zinc complexes, stabilisers based on erythritols, e.g. pentaerythritol tetrakis(3-(3,5-di-tert-butyl-4-hydroxyphenyl)-propionate) (marketed as Irganox™ 1010), phosphites, such as Tris(2,4-ditert-butylphenyl)phosphite (marketed as Irgafos™ 168), and/or mixtures thereof.

As example, PVC stabilizers may be added in an amount of e.g. 1% calcium-zinc complex (markted as Baeropan™ MC 8850) and /or 0.4% pentaerythritol tetrakis(3-(3,5-di-tert-butyl-4-hydroxyphenyl)propionate) (marketed as Irganox™ 1010) and/or 0.2% Tris(2,4-ditert-butylphenyl) phosphite (marketed as Irgafos™ 168).

Suitable colorants are among others Titanium (IV)-oxide, carbon black, masterbatch and ultrabatch compounded colorants. Also, fillers such as calciumcarbonate, fibers of natural or mineral origin and foaming agents like Hydrocerol® (made by Clairant) can be used.

EXAMPLES

All examples involving test of physical properties made below involves testing at least the same number of test specimens and reference specimens. 4 repetitions are made of each of the examples, unless the relevant standard used for the tests requires otherwise.

Reference sample is pure PVC, (C2H3Cl)$_n$
Melt Temperature 212-260° C.
Tensile Strength 66,1 MPa
Specific Gravity~1.38-1.45 g/cm$^3$
Antioxidants have been added to all compositions (1 Baeropan MC 8850 for PVC and 0.4%
Irganox 1010+0.2% Irgafos 168 for Elvaloy 741 and PVB).

Compounds have been prepared on a roll mill at 195° C. for 12 minutes.

Plates have been produced on a Collin press at 180° C. and 150 bars for 3 minutes and then at 50° C. during 5 minutes for cooling.

Physical properties of plasticizer composition with 50%/50% by weight of PVB and an Ethylene Copolymer Resin (Elvaloy 741™, produced by DuPont)

Melting point 130-170° C., extrusion temperature 140-160° C.

Storage Stability

Stored at temperatures between 5° C. and 30° C. Shelf life with full reactivity is 18 months.

Compared to a reference-pure PVC a blend with 40% of 50%/50% compound with Elvaloy 741™ and PVB gives the following results:

Example 1: Preparation of Test Specimens

Processing: Compounds have been prepared on a roll mill at 195° C. for 12 minutes.

Plates have been produced on a Collin press at 180° C. and 150 bars for 3 minutes and then at 50° C. for 5 minutes for cooling. From these plates there has been prepared test samples according to the measures in the ISO and ASTM standards. The test specimens were cut from the plate in the required sizes described in the tests.

Compound Heat Stabilization

Antioxidants have been added to all compositions (1% PVC stabilizer as a Calcium-zinc complex (Baeropan™ MC 8850) and 0.4% PVB stabilizer Pentaerythritol tetrakis(3-(3,5-di-tert-butyl-4-hydroxyphenyl)propionate) (Irganox™ 1010)+0.2% Tris(2,4-ditert-butylphenyl)phosphite (Irgafos™ 168)

Reference specimens were made from pure PVC.

Test specimens according to the present invention were prepared from a plasticizer blend of 50% by weight of PVB with 50% by weight of Ethylene Copolymer Resin (Elvaloy™ 741) plasticizer composition (named PVB compound in FIGS. 1-17) added in an amount of 40% by weight to 60% by weight of PVC:

Example 2

Flexural modulus measured according to
ISO 178:2010 shows a decrease relative to the PVC of −85% on reference specimens as well as test specimens made according to example 1. Results.

Measurements have been done by testing specimens of rectangular cross-section being 80×10×4 mm, resting on two supports, being deflected by a loading edge acting on the specimen midway between the supports. The test specimen is deflected in this way at a constant rate at midspan until rupture occurs at the outer surface of the specimen or until a maximum strain of 5% is reached, whichever occurs first. During this procedure, the force applied to the specimen and the resulting deflection of the specimen at midspan are measured. The resulting softening/plasticization is interpreted as an evidence of the claimed function of the compound. The results are shown in FIG. 1 where the average values of flexural modulus is shown for the pure PVC reference specimen and the test specimen made with a plasticizer blend of PVB+Elvaloy 741 as explained above.

Example 3

Tensile modulus measured according to ISO 527-2:2012 shows a decrease relative to pure PVC. Measurements have been done using an extensometer measuring specimens 20 mm in the parallel parts and with an overall length of 35 mm. Thickness is 1 mm. The type of the specimens is referred to as 5 A.

Figure 2:
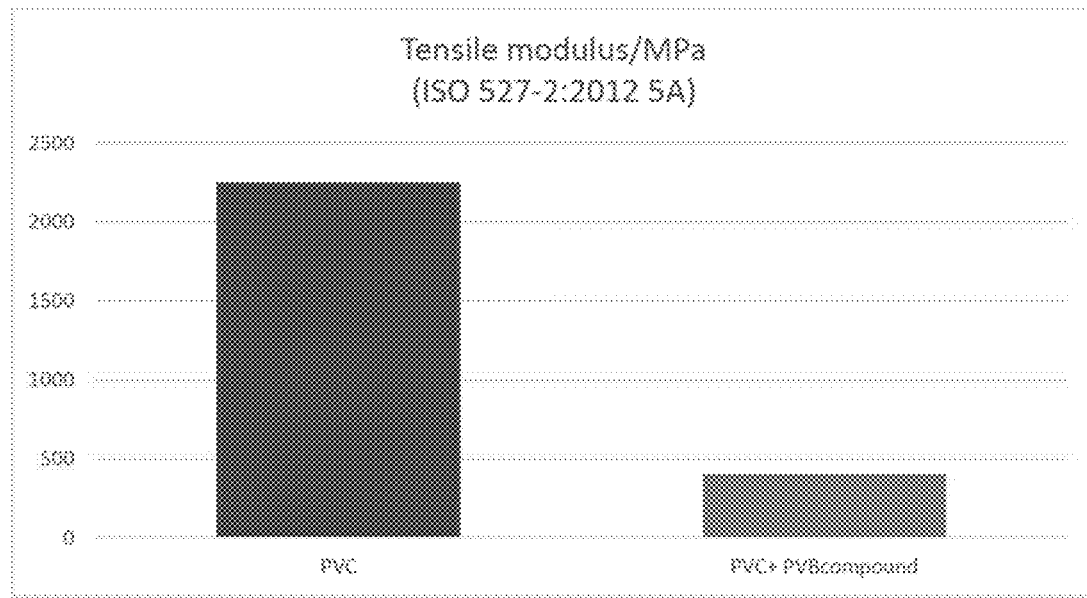
FIG. 2 depicts values of tensile modulus for the pure PVC reference specimen and the test specimens.

The plasticizing of PVC by the plasticizer composition according to the present invention and as discussed in example 1 gives a change of −83%, see FIG. 2.

Example 4

Figure 3:
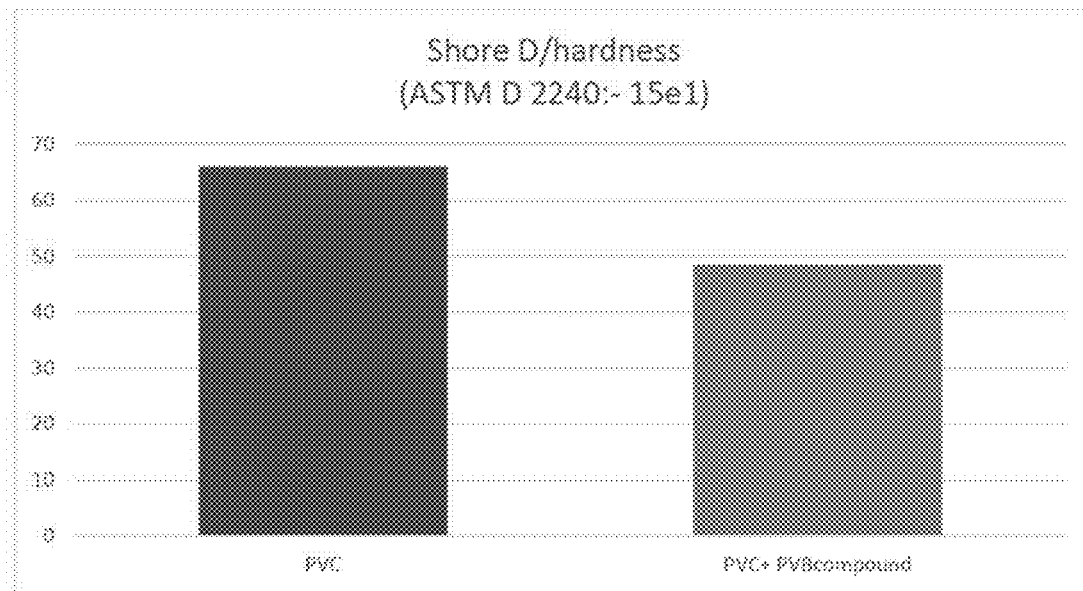
FIG. 3 depicts measured hardness for the pure PVC reference specimen and the test specimens.

Shore D hardness measured according to the specification in
ASTM D2240-15e1 using a Reichert MHP microhardness tester with a Vickers diamond, and correlation to test samples of known Shore hardness, shows a −27% decrease in hardness, meaning plasticization by the compound has taken place, see FIG. 3.

Example 5

Figure 4:
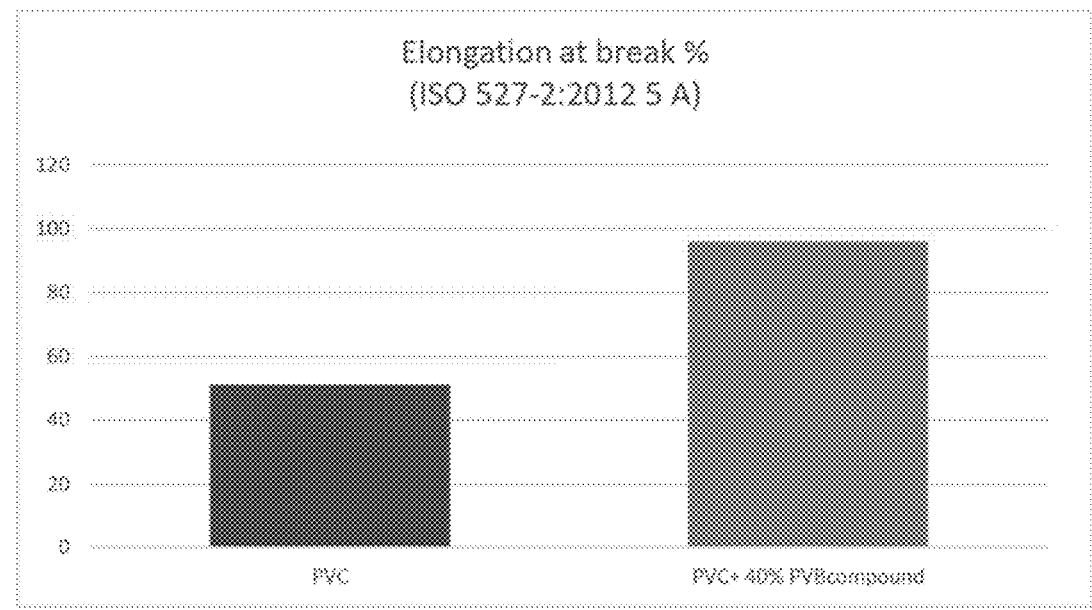
FIG. 4 depicts measurements of elongation at break for the pure PVC reference specimen and a test specimen.

Elongation at break measured according to ISO 527-2:2012 shows an increase relative to PVC of 89%, see FIG. 4. Measurements have been done using an extensometer measuring specimens 20 mm in the parallel parts and with an overall length of 35 mm. Thickness is 1 mm. The type of the specimens is referred to as 5 A in the standard.

The increased ability to stretch is interpreted as an effect of the plasticization effect of the compound.

Example 6

Figure 5:
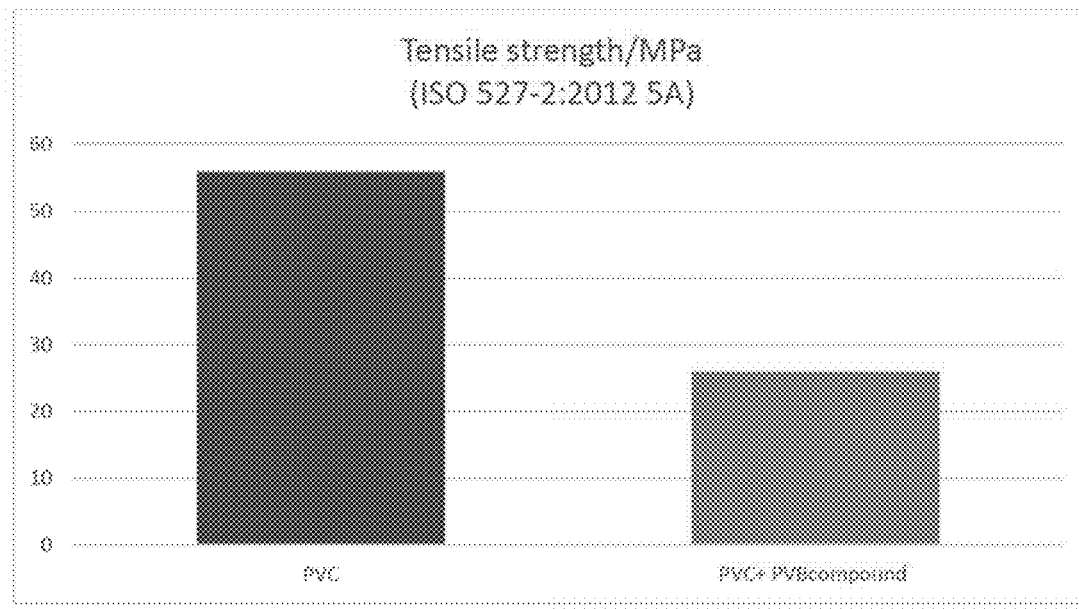
FIG. 5 depicts measured tensile strength for the pure PVC reference specimen and a test specimen.

Tensile strength shows relative to PVC a change of −66% see FIG. 5. Measurements have been done using an extensometer measuring specimens 20 mm in the parallel parts and with an overall length of 35 mm. Thickness is 1 mm. The type of the specimens is referred to as 5 A.

The change in tensile strength is interpreted as an effect of the plasticization effect of the compound.

Example 7: Flexural Modulus

Figure 6:
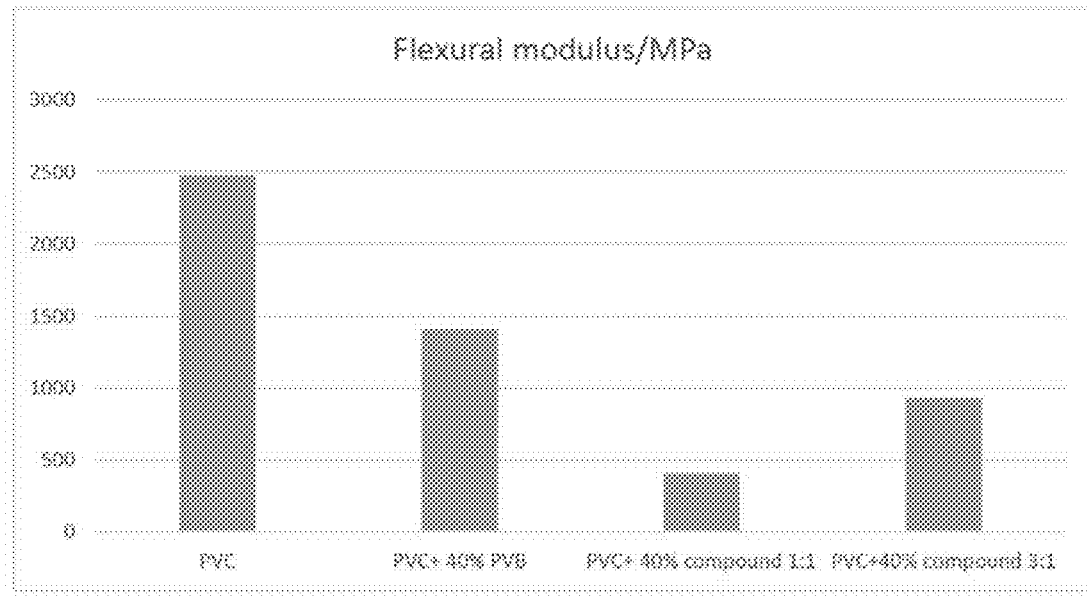
FIG. 6 depicts values of flexural modulus for the pure PVC reference specimen and three test specimens.

A PVC reference specimen is compared to test specimens of polymer blends with 40% rPVB, and to the plasticizer according to the present invention being 50%/50% blend rPVB/Elvaloy 741 (called 1:1 on FIG. 6), and a compound being 75%/25% blend rPVB/Elvaloy 741 (called 3:1 on FIG. 6). (the prefix "r" means that the relevant polymers are recycled from waste fractions of that specific polymer.)

Flexural modulus measured according to ISO 178:2010 shows a decrease relative to the PVC reference specimen, see FIG. 6.

Measurements have been done by testing specimens of rectangular cross-section being 80×10×4 mm, resting on two supports, being deflected by a loading edge acting on the specimen midway between the supports. The test specimen is deflected in this way at a constant rate at midspan until rupture occurs at the outer surface of the specimen or until a maximum strain of 5% is reached, whichever occurs first. During this procedure, the force applied to the specimen and the resulting deflection of the specimen at midspan are measured.

The results show that PVC+40% compound in a 1:1 ratio of PVB and Elvaloy 741® shows a significant lower flexural modulus than if a 3:1 mixing ratio of PVB and Elvaloy 741® was applied, see FIG. 6. Here it must be noted that the pure mix PVB/PVC is resulting in a heterogeneous product with microdomains, with sizes depending on the mixing technique.

Example 8: Tensile Modulus

Tensile modulus is tested on specimens with a composition as described in example 7.

Figure 7:
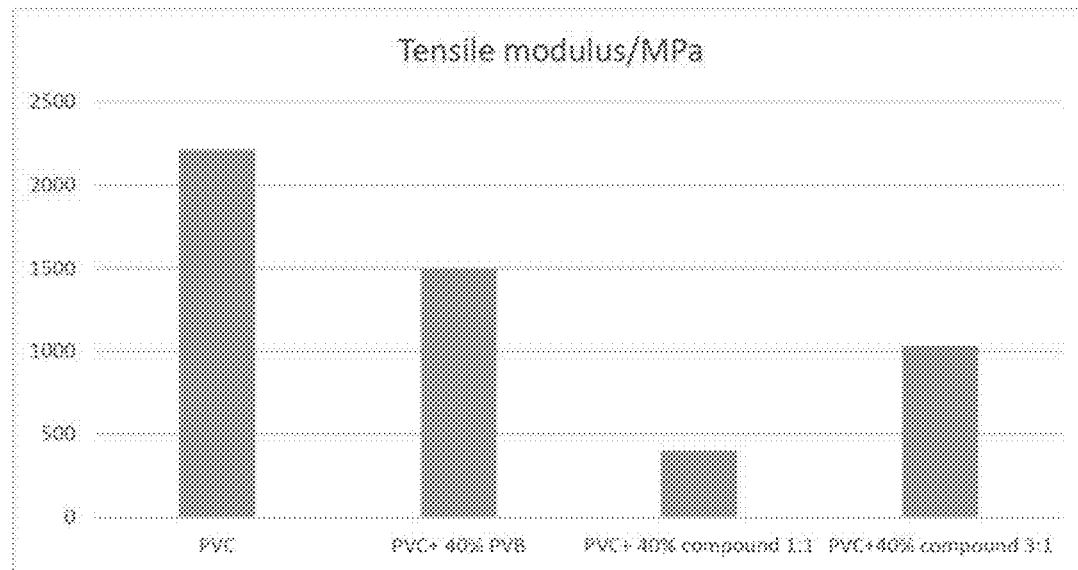
FIG. 7 depicts values of tensile modulus for the pure PVC reference specimen and the three test specimens of FIG. 6.

Tensile modulus measured according to ISO 527-2:2012 shows a decrease relative to PVC, see FIG. 7. Measurements have been done using an extensometer measuring specimens 20 mm in the parallel parts and with an overall length of 35 mm. Thickness is 1 mm. The type of the specimens is referred to as 5 A in the standard.

The plasticizing of PVC by the compound claimed shows that PVC+40% compound in a 1:1 ratio of PVB and Elvaloy 741® shows a significantly lower flexural modulus than if a 3:1 mixing ratio was applied. A further increase like 1:2 will give higher tensile modulus.

Example 9: Shore D Hardness

Shore D hardness is tested on specimens with a composition as described in example 7.

Figure 8:
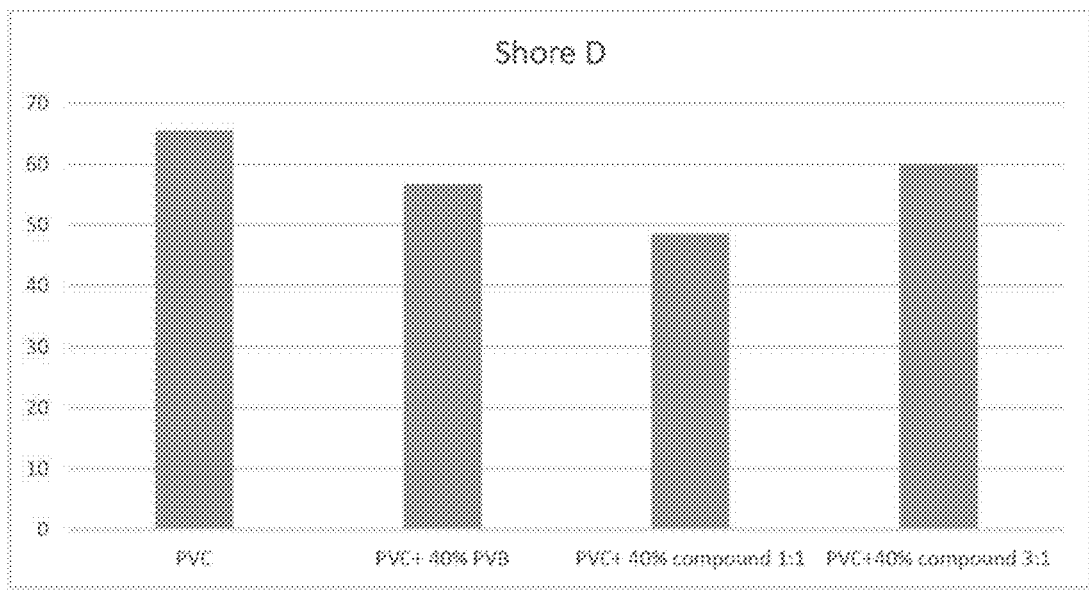
FIG. 8 depicts values of Shore D hardness for the pure PVC reference specimen and the three test specimens of FIGS. 6 and 7.
Figure 9:
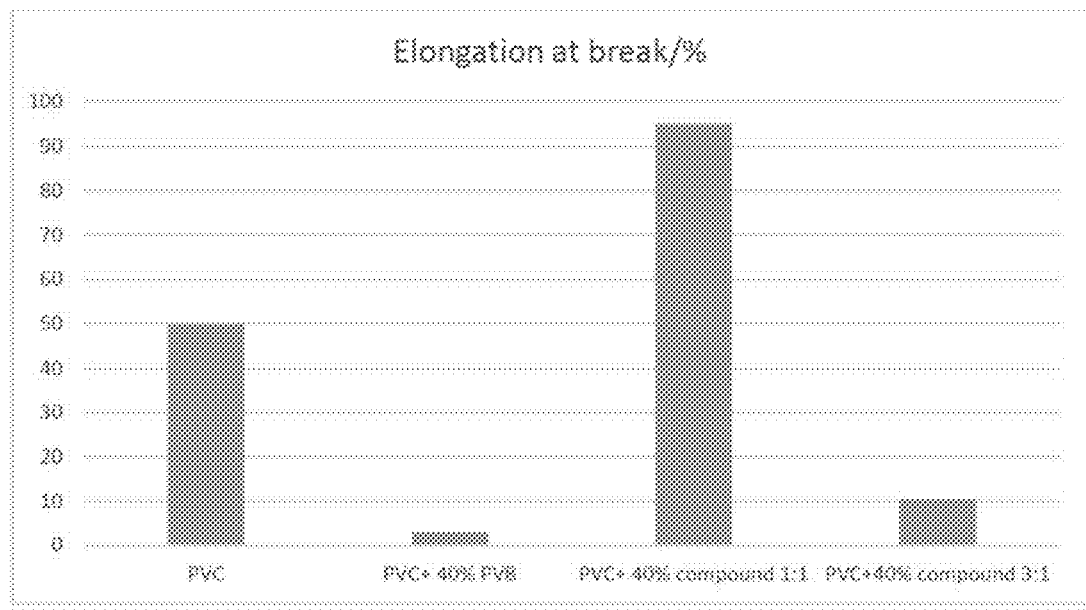
FIG. 9 depicts values of elongation at break for the pure PVC reference specimen and the three test specimens of FIGS. 6-8.

Shore D hardness measured according to the specification in ASTM D2240-15e1 using a Reichert MHP microhardness tester with a Vickers diamond shows decrease in hardness, depending on the amount of compound used, see FIG. 8.

Example 10: Elongation of Break

Elongation at break is tested on specimens with a composition as described in example 7.

Elongation of break measured according to ISO 527-2:2012 shows an increase relative to PVC. Measurements have been done using an extensometer measuring specimens 20 mm in the parallel parts and with an overall length of 35 mm. Thickness is 1 mm. The type of the specimens is referred to as 5 A.

The plasticizing of PVC by the plasticizer composition according to embodiments of the present invention shows that PVC+40% compound in a 1:1 ratio shows a significantly higher elongation at break than if a 3:1 mixing ratio was applied. PVB alone with PVC makes a very inelastic product, and the results shows that a certain optimum exists were the values change rapidly, see FIG. 9.

Example 11: Tensile Strength

Tensile strength is tested on specimens with a composition as described in example 7.

Tensile strength measured according to
ISO 527-2:2012 shows a decrease relative to PVC. Measurements have been done using an extensometer measuring specimens 20 mm in the parallel parts and with an overall length of 35 mm. Thickness is 1 mm. The type of the specimens is referred to as 5 A.

Figure 10:
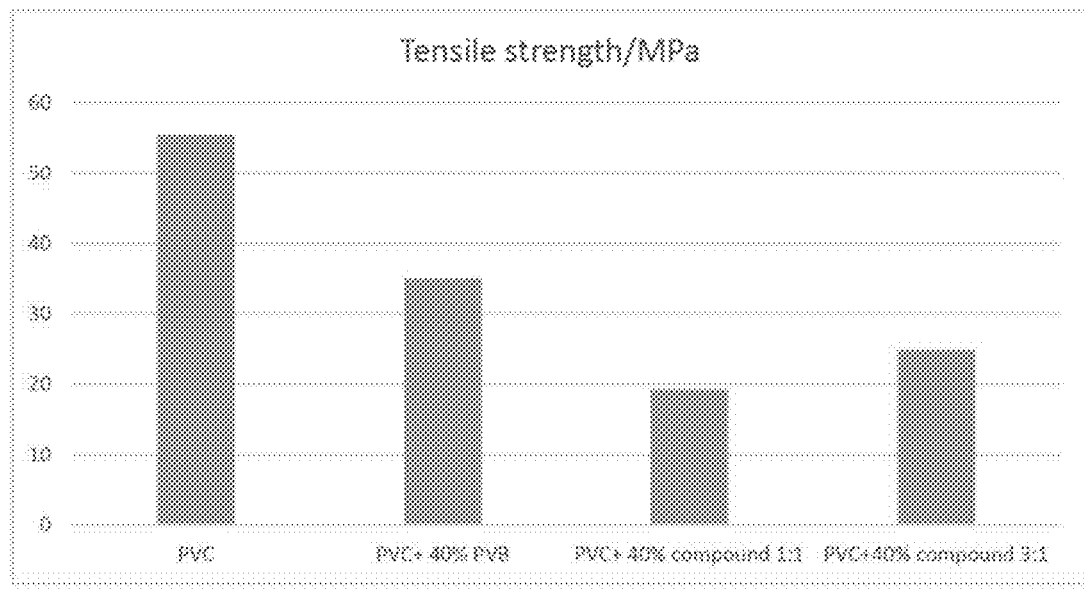
FIG. 10 depicts values of tensile strength for the pure PVC reference specimen and the three test specimens of FIGS. 6-9.
Figure 11:
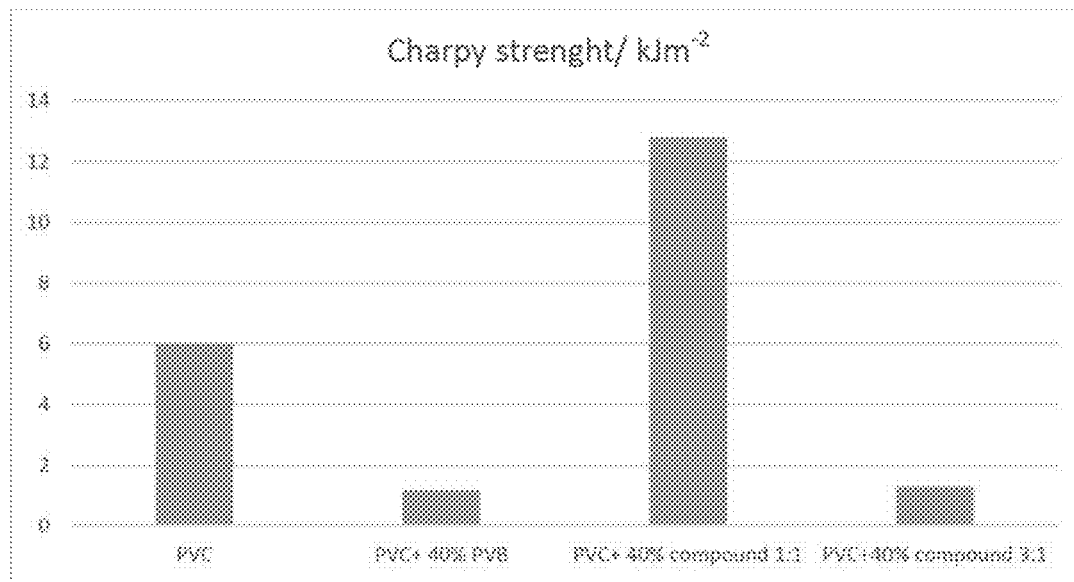
FIG. 11 depicts values of Charpy strength for the pure PVC reference specimen and the three test specimens of FIGS. 6-10.
Figure 12:
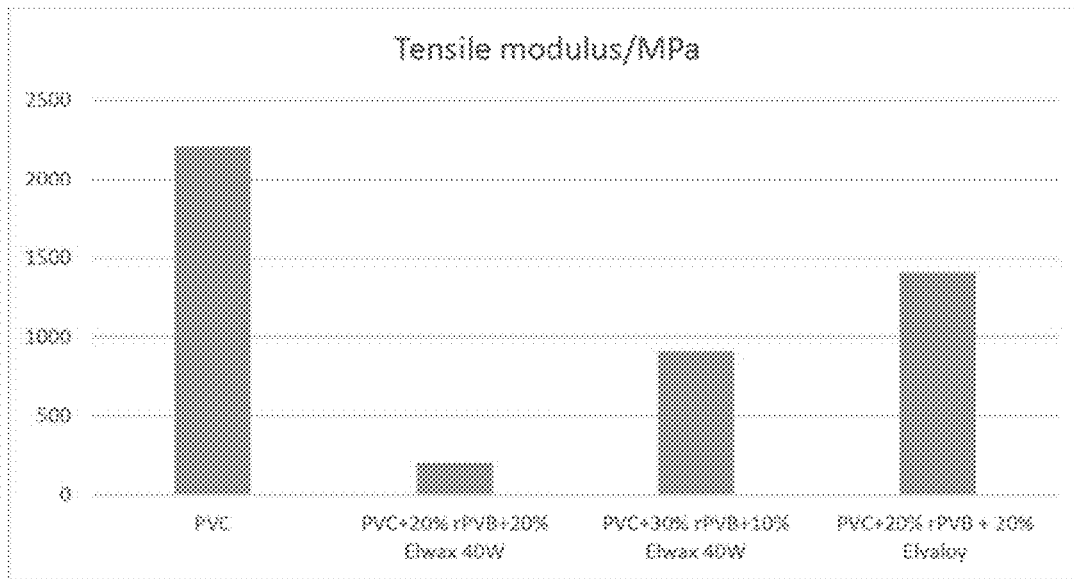
FIG. 12 depicts values of tensile modulus for the pure PVC reference specimen and three further test samples.
Figure 13:
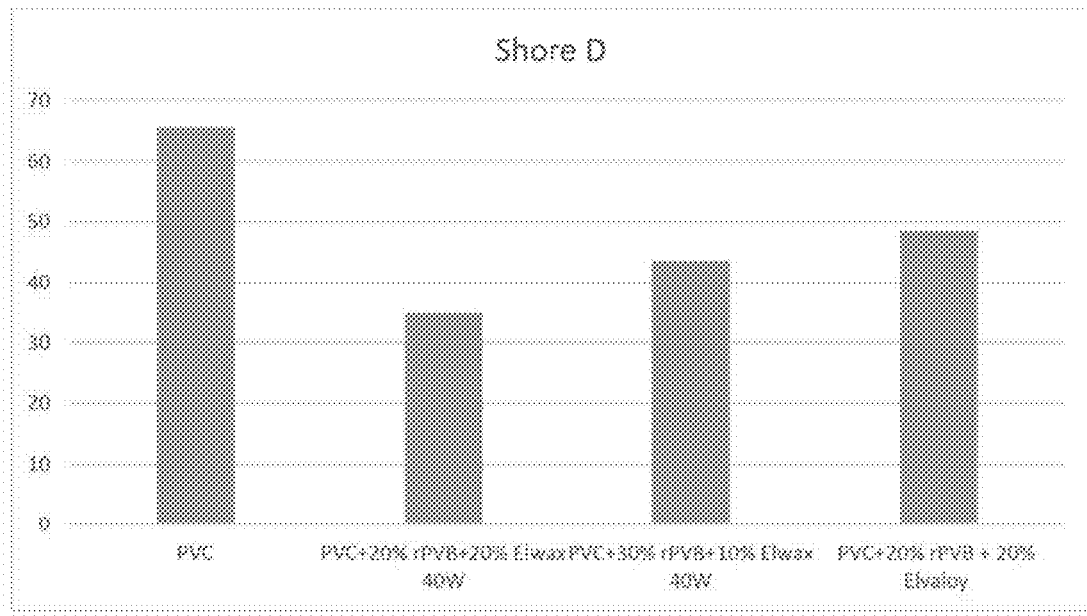
FIG. 13 depicts values of Shore D hardness for the pure PVC reference specimen and the three further test samples of FIG. 12.
Figure 14:
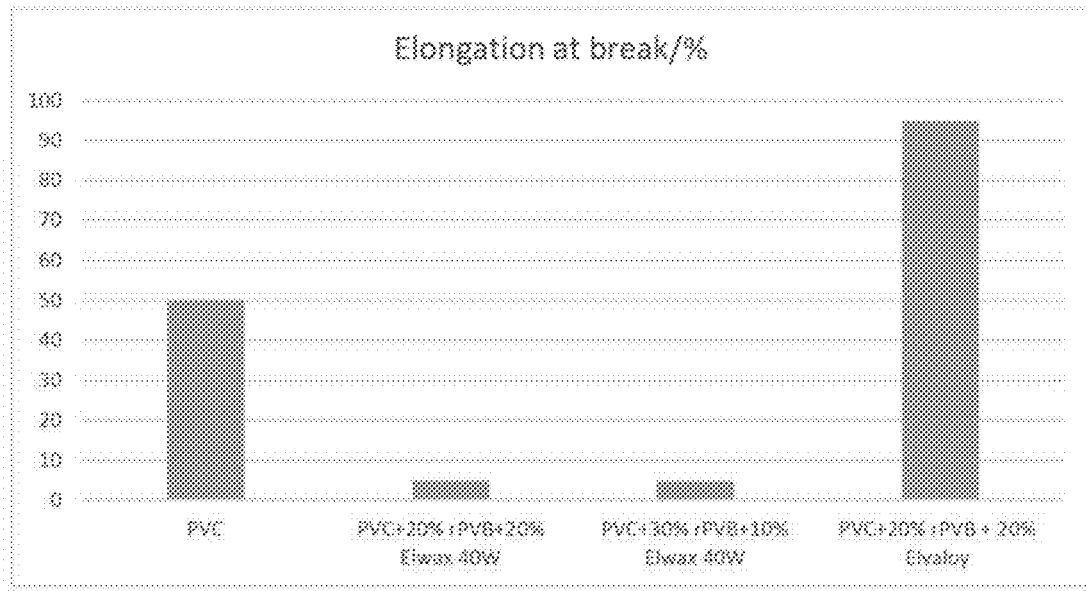
FIG. 14 depicts values of elongation at break for the pure PVC reference specimen and the three further test samples of FIGS. 12-13.
Figure 15:
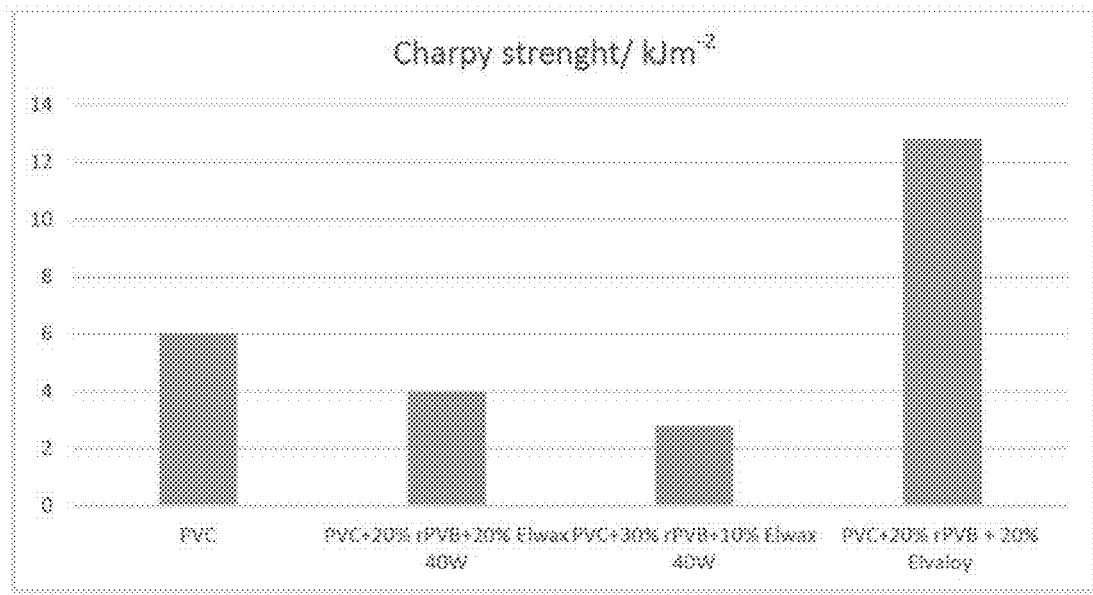
FIG. 15 depicts values of Charpy strength for the pure PVC reference specimen and the three further test samples of FIGS. 12-14.

The plasticizing of PVC by the compound claimed shows that PVC+40% compound in a 1:1 ratio shows a significantly lower tensile strength than if a 3:1 mixing ratio was applied, see FIG. 10. A further increase like 1:2 will give higher tensile strength.

Example 12: Charpy Test

Charpy strength is tested on specimens with a composition as described in example 7.

Charpy strength is tested according to ISO 148-1:2016 of specimen 55×10×10 mm.

This test consists of breaking a notched test piece with a single blow from a swinging pendulum. The notch in the test piece has a specified geometry and is in the middle between two supports, opposite to the location which is impacted. The energy absorbed in the sample is graphed. Thee result shows a better energy absorption due to energy dissipation in the modified compound, mainly from the PVB molecular backbone, see FIG. 11.

Example 13

Charpy strength is tested on reference specimens of pure PVC and test specimens with a composition of A: 60% by weight PVC+20% by weight of rPVB and 20% by weight of Elwax™ W40

B: 60% by weight PVC+30% by weight of rPVB and 10% by weight of Elwax™ W40, and

C: 60% by weight PVC+20% by weight of rPVB and 20% by weight of Elvaloy 741

Using as comparable example cheaper Elwax™ W40 the plasticizing effect with rPVB works as well, but the elongation at break suffers, as well as the Charpy strength, see results in FIGS. 12-15:

Example 14: Contact Angle

Contact angle is tested on reference specimens of pure PVC and test specimens with a composition of A: 60% by weight PVC+40% by weight of rPBV as well as B: 60% by weight PVC+20% by weight of rPVB and 20% by weight of Elvaloy 741.

Increase of contact angle to water is measured as in ISO 15989:2004. Droplets of double quarts redistilled water is applied with a manual micro syringe equipped with a platinum flat tip needle on top of the specimen. Photographs in 1:1 with LED illumination are image analysed in ImageJ (NIST) making both elliptical and spherical approximation to the drop surface with compensation for gravity. The contact angle is determined on both sides of the image and mediated.

Figure 16:
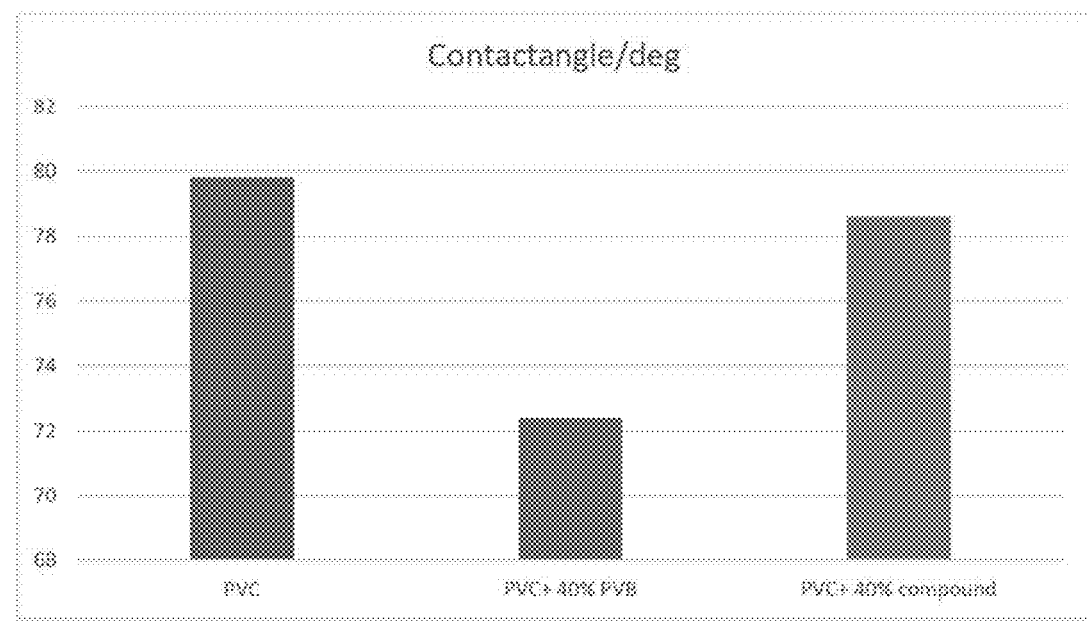
FIG. 16 depicts values of contact angle for the pure PVC reference specimen and two test specimens.

The result shows a slight change in wettability of the surface, where PVB alone adds hygroscopicity and the combination with Elvaloy® rolls this back, see results in FIG. 16.

Figure 17:
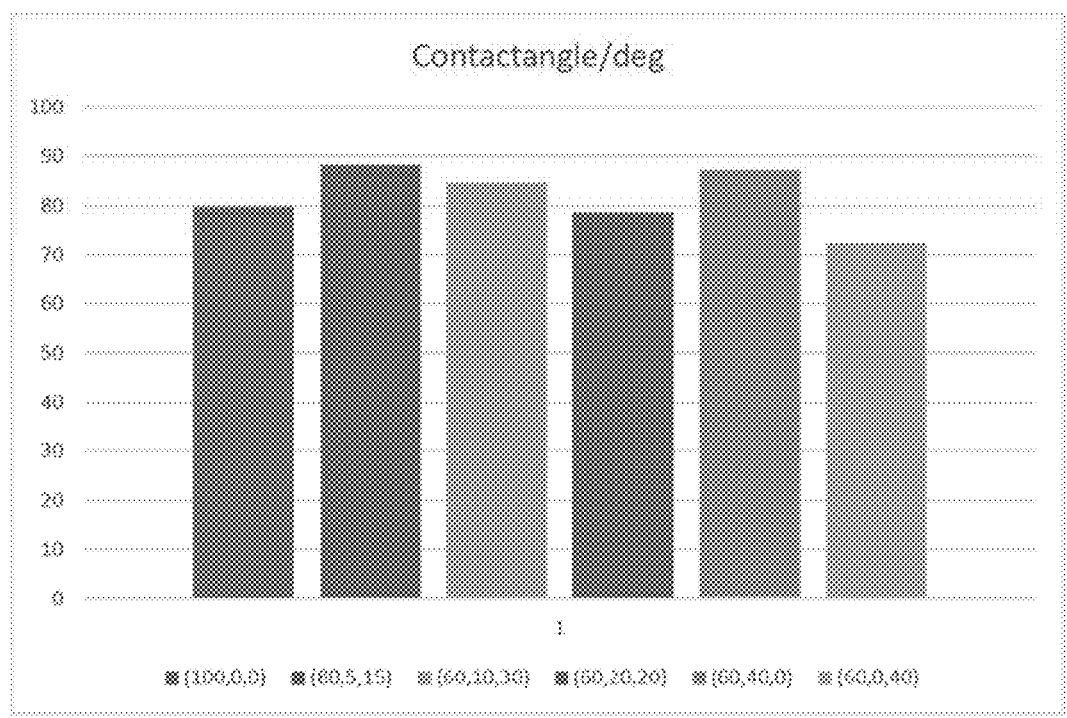
FIG. 17 depicts values of contact angle for the pure PVC reference specimen and five additional test specimens.

Contact angle measurements shown in FIG. 17 were tested on reference specimens of pure PVC and different test specimens with varying content of Elvaloy 741 and rPVB (content for each test is mentioned in % by weight of PVC, Elvaloy 741™, rPVB under the bars in the order that they appear in the bars) The contact angle measurements show only slight change in surface wetting with changes in amounts of rPVB and Elvaloy 741.

Example 15: Extraction of PVB

Migration of PVB from test samples is tested on test specimens prepared as described in example 1 with a composition of 60% by weight PVC +20% by weight of rPVB and 20% by weight of Elvaloy 741.

Extraction experiments at 100° C., 30 min, using a 70 ml Duran Soxhlet extractor, and a 10 g sample in double distilled water showed no extraction of the plasticizer of PVB within the measurement accuracy in gravimetry. By Soxhlet extraction at 95° C., 30 min, of a 10 g sample in 98.9% methanol, anhydrous, an insignificant weight loss of 0.01% was measured.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A polymer composition comprising a construction polymer and a plasticizer composition, wherein the construction polymer comprises 25-90% by weight and the plasticizer composition comprises 10-75% by weight of the polymer composition; and wherein said plasticizer composition comprises 35-65% (by weight) of polyvinylbutyral (PVB) and 65-35% (by weight) of one or more alloying copolymers, wherein the one or more alloying copolymers includes an Ethylene vinyl alcohol Copolymer Resin.

2. The polymer composition according to claim 1, wherein the polyvinylbutyral component is selected from recycled polyvinylbutyral, virgin polyvinylbutyral, and a mixture thereof.

3. The polymer composition according to claim 1, further comprising one or more other alloying copolymer, wherein the one or more other alloying copolymer is selected from the group comprising:

Ethylene copolymer based compatibilizers;

a modified ethylene acrylate carbon monoxide terpolymer composition comprising ethylene vinyl acetates (EVAs), polyethylenes, metallocene polyethylenes, ionomers, ethylene propylene rubbers, and polypropylenes;

functional polymers working as compatibilization promoter for polar polymers, ethylene vinyl acetate copolymer, and/or mixtures thereof; and a combination thereof.

4. The polymer composition according to claim 1, further comprising one or more other alloying copolymer.

5. The polymer composition according to claim 1, wherein said plasticizer composition comprises 40-60% of PVB with 60-40% by weight of the alloying copolymer(s).

6. The polymer composition according to claim 1, wherein said plasticizer composition comprises 45-55% by weight of PVB and 55-45% by weight of the alloying copolymer(s).

7. The polymer composition according to claim 1, wherein the construction polymer is selected from polyvinyl chloride (PVC), polypropylene (PP), poly urethane (PU), acryl butadiene styrene (ABS), polyethylene (PE), and mixtures thereof.

8. The polymer composition according to claim 1, wherein the plasticizer composition constitutes 30-50% by weight of the polymer composition.

9. The polymer composition according to claim 1, wherein the construction polymer is selected from virgin polyvinyl chloride (PVC), or recycled polyvinyl chloride (PVC), and a mixture thereof.

10. The polymer composition according to claim 1, wherein the polymer composition is mixed with at least one further component.

11. The polymer composition according to claim 10, wherein the at least one further component is selected from a stabilizer, a colorant, an antioxidant, a filler, a UV filter, and a mixture thereof.

12. A method of modifying a construction polymer comprising the steps of:

mixing 25-90% by weight of the construction polymer and 10-75% by weight of a plasticizer composition, wherein the plasticizer composition comprises 35-65% (by weight) of polyvinylbutyral (PVB) and 65-35% (by weight) of one or more alloying copolymers, wherein the one or more alloying copolymers includes an Ethylene vinyl alcohol Copolymer Resin;

heating the mixed construction polymer and plasticizer composition above a melting point; and shaping the heated mixed construction polymer and plasticizer composition.

13. The method according to claim 12, wherein the heating is included in the shaping.

14. The method according to claim 12, wherein the plasticizer composition comprises 45-55% (by weight) of polyvinylbutyral (PVB) and 55-45% (by weight) of an alloying copolymer.

15. The method according to claim 12, wherein the polymer composition comprises 35-45% by weight of the plasticizer composition and 65-55% by weight of construction polymer.

16. The method according to claim 12, comprising the step of adding at least one additional additive to the mixture of plasticizer composition and construction polymer when the polymer composition is in a solid or melted state.

17. A method for providing a polymer composition, the polymer composition comprising a construction polymer and a plasticizer composition, wherein the construction polymer comprises 25-90% by weight and the plasticizer composition comprises 10-75% by weight of the polymer composition, and wherein the plasticizer composition comprises 35-65% (by weight) of polyvinylbutyral (PVB) and 65-35% (by weight) of at least one alloying copolymer, wherein the at least one alloying copolymer includes an Ethylene vinyl alcohol Copolymer Resin, the method comprising:

modifying the construction polymer by mixing 25-90% by weight of the construction polymer and 10-75% by weight of the plasticizer composition, heating the mixed construction polymer and plasticizer composition above a melting point and shaping the heated mixed construction polymer and plasticizer composition.

\* \* \* \* \*